United States Patent
Ogawa et al.

(10) Patent No.: US 7,675,713 B2
(45) Date of Patent: Mar. 9, 2010

(54) HEAD SUSPENSION WITH FLEXURE VIBRATION CLEARANCE

(75) Inventors: Hidenori Ogawa, Aikoh-gun (JP); Toshiki Ando, Aikoh-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 953 days.

(21) Appl. No.: 11/442,813

(22) Filed: May 30, 2006

(65) Prior Publication Data

US 2006/0268461 A1   Nov. 30, 2006

(30) Foreign Application Priority Data

May 27, 2005   (JP)   ............................. 2005-155916

(51) Int. Cl.
*G11B 5/55* (2006.01)
(52) U.S. Cl. .................................. 360/264.2; 360/245.9
(58) Field of Classification Search .............. 360/245.9, 360/264.2
See application file for complete search history.

(56) References Cited

U.S. PATENT DOCUMENTS

2005/0030670 A1 *   2/2005   Ando et al. ............... 360/244.8

FOREIGN PATENT DOCUMENTS

| JP | 2002-133813 | 5/2002 |
|----|-------------|--------|
| JP | 2002-237013 | 8/2002 |
| JP | 2003-151114 | 5/2003 |
| JP | 2005-056455 | 3/2005 |

* cited by examiner

*Primary Examiner*—A. J. Heinz
(74) *Attorney, Agent, or Firm*—Jordan and Hamburg LLP

(57) ABSTRACT

A head suspension for a hard disk drive has a base attached to a carriage of the hard disk drive and is turned around a spindle. A load beam includes a rigid part and a resilient part which applies load onto a head at a front end of the load beam to write and read data to and from a disk arranged in the hard disk drive. The rigid part is supported to the base through the resilient part. A flexure is attached to at least the rigid part of the load beam and has read/write wiring patterns connected to the head. A recessed portion or a through-hole portion is formed in at least one of the load beam and the base for avoiding vibration contact of the flexure.

15 Claims, 4 Drawing Sheets

HEAD SUSPENSION WITH FLEXURE VIBRATION CLEARANCE

BACKGROUND OF THE INVENTION

1. Field of the Invention

The present invention relates to a head suspension for a hard disk drive incorporated in an information or data processing apparatus such as a computer.

2. Description of the Related Art

In general, a head suspension for a hard disk drive includes a base plate, a load beam extending from the base plate toward a head, a flexure, and the like. The load beam is conventionally made of a stainless steel such as SUS304 or SUS301 (Japanese Industrial Standard) with a plate thickness of about 20 μm to 100 μm. The flexure is conventionally formed by applying an insulating material layer (polyimide) and an electrically conductive layer (copper) on a base material made of a stainless steel plate (SUS304) with a plate thickness of 20 μm or a proper resilient material using a laminating process or a usual photolithographic process.

FIG. 5 shows a chain product of flexures. The chain product has a plurality of flexures 101. Each flexure 101 includes a base material and electrically conductive layers formed on the base material. Respective flexures 101 are mutually connected by coupling portions 103 of base materials. At a time of assembling a head suspension, each flexure 101 is cut off at the coupling portion 103 as a single part stacked on each base plate and each load beam, and these stacked members are welded and fixed at their predetermined spots by, for example, laser welding. After assembled, ultrasonic washing is performed on an assembled head suspension.

FIG. 6 is an enlarged plan view partly showing an assembled head suspension.

As described above, the flexure 101 is cut at the coupling portion 103 to constitute the single part. The cut coupling portion 103 remains on each side of the flexure to form a cut portion 105. After assembling, the cut portion 105 overlaps a rigid part 109 of a load beam 107 as shown in FIG. 6. In this state, the cut portions 105 serves as free ends which can be freely supported to the rigid part 109.

Therefore, in the ultrasonic washing after the completion of the assembly, the cut portions 105 vibrate or flutter to repeatedly contact with a surface of the rigid part 109. This causes color change or discoloration at the contacting portions of the rigid part 109. Especially, the cut portion 105 has burrs, due to cutting, that are directed toward the rigid part 109, so that color change tends to become significant.

In a case of the flexure 101 including a curved portion curving sideward on the base plate, the curved portion vibrates or flutters to repeatedly contact with the base plate side to color-change during the ultrasonic washing.

To solve the problem, a chain product of flexures 101A as shown in FIG. 7 is adopted. The chain product has coupling portions 103A. The coupling portions 103A is formed to be slightly long as compared with the coupling portions 103 of FIG. 6, to set cut portions 105A of FIG. 8 to be longer than the cut portions 105 of FIG. 6, so that free ends of the cut portions 105A are positioned outside the rigid part 109. In this case, the cut portions 105A, particularly, the free ends do not contact with the rigid part 109, when the cut portions 105A vibrate or flutter. Therefore, color change due to vibration contact of the flexure with the rigid part 109 during the ultrasonic washing can be suppressed.

However, this structure involves a restraint for layout in view of base material formation of the flexure, and thereby design with high flexibility can not be achieved.

Additionally, this structure can not suppress the color change at the curved portion, either. For the details of the above-mentioned related art, Japanese Unexamined Patent Application Publication No. 2002-237013 can be referred to.

SUMMARY OF THE INVENTION

An object of the present invention is to provide a head suspension, capable of achieving high flexibility for design while suppressing color change or discoloration on the load beam or the like due to vibration contact of a part of a flexure.

In order to accomplish the object, the present invention is most characterized by a recessed portion or a through-hole portion for avoiding vibration contact of a flexure provided on at least one of a load beam and a base.

An aspect of the present invention provides a head suspension having a load beam supported to a base and a flexure attached to at least a rigid part of the load beam. In at least one of the load beam and base, a recessed portion or a through-hole portion for avoiding vibration contact of the flexure is provided. Accordingly, even if a cut portion of the flexure vibrates or flutters during ultrasonic washing, the recessed portion or the through-hole portion can suppress vibration contact of a part of the flexure with the load beam side or the base plate side. Therefore, color change or discoloration on the load beam side or the base plate side can be suppressed.

It is unnecessary to elongate the cut portion for avoiding color change, and thereby high flexibility for design can be achieved.

DETAILED DESCRIPTION OF EMBODIMENTS

Head suspensions according to embodiments of the present invention will be explained in detail. Each of the embodiments provides at least one of a load beam and a base with a recessed portion or through-hole portion to achieve high flexibility for design of a flexure while suppressing color change or discoloration of the load beam or a base plate.

First Embodiment

First, general constitution of a head suspension according to a first embodiment will be explained.

Figure 1:
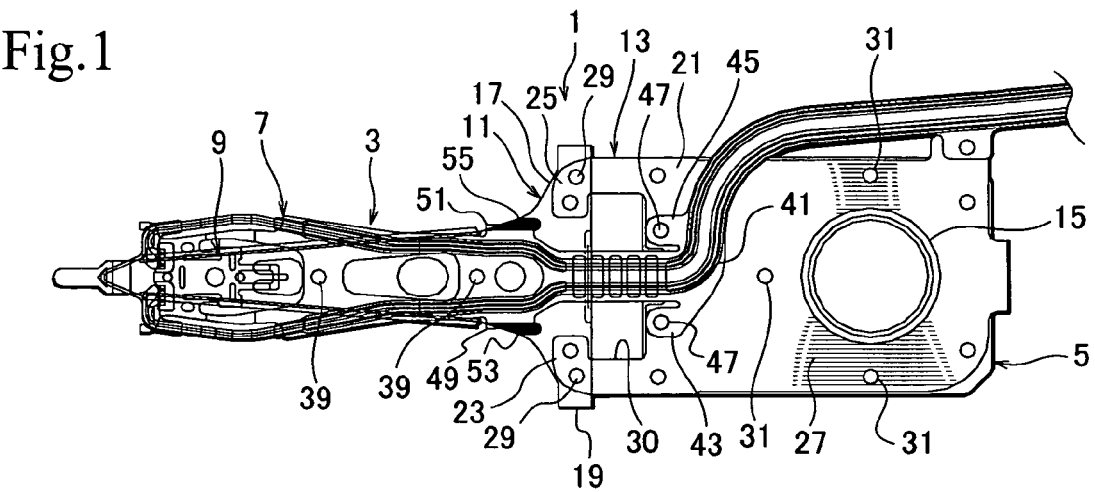
FIG. 1 is a partially transmissive plan view showing a head suspension according to a first embodiment of the present invention.
Figure 2:
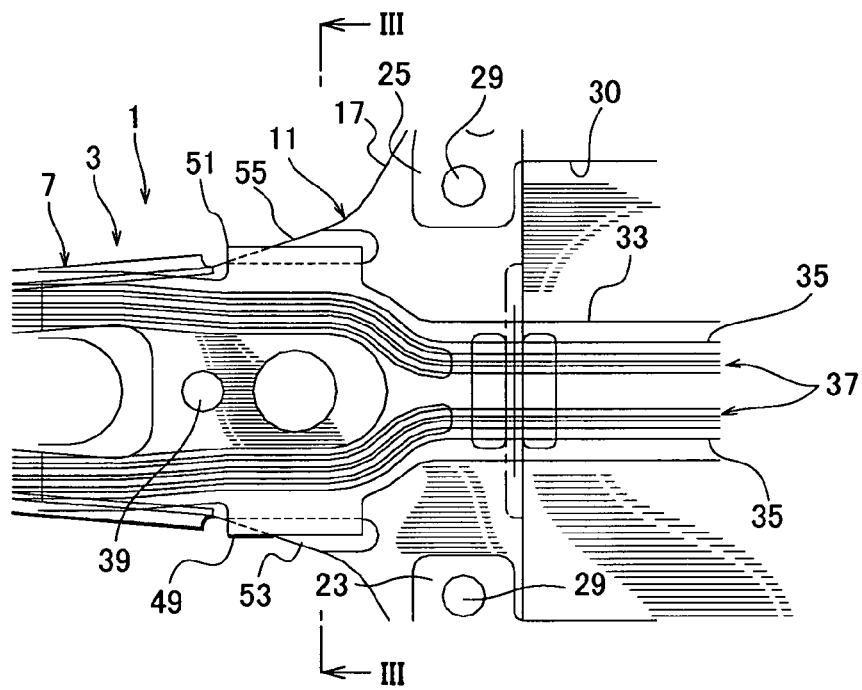
FIG. 2 is an enlarged plan view partly showing the head suspension of FIG. 1.
Figure 3A:
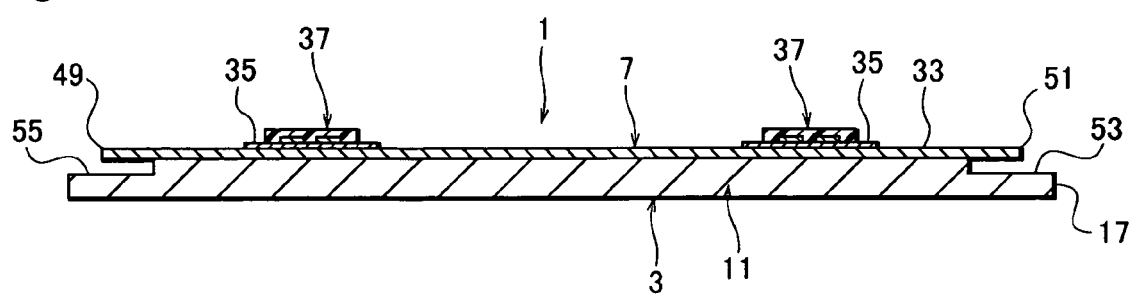
FIG. 3A is a sectional view taken along a line III-III of FIG. 2.

FIG. 1 is a partially transmissive plan view showing a head suspension according to a first embodiment of the present invention, FIG. 2 is an enlarged plan view partly showing the head suspension of FIG. 1, and FIG. 3A is a sectional view taken along a line III-III of FIG. 2.

A head suspension 1 shown in FIGS. 1 to 3 is provided with a load beam 3, a base plate 5 corresponding to a base, a flexure 7, and the like.

The load beam 3 applies load onto a head 9 that is arrange at a front end of the load beam 3 to write and read data to and from a disk arranged in the hard disk drive. The load beam 3 includes a rigid part (beam, or flange portion) 11 and a resilient part (or hinge) 13.

The base plate 5 has a rectangular plate shape. The base plate 15 includes a boss 15. The boss 15 is attached by swaging or the like to an arm of a carriage installed in a hard disk drive, so that the base plate 5 may turn around a spindle. The base plate 5 may be integrated with an arm that is attached to the carriage.

The rigid part 11 is made from, for example, stainless steel, and a thickness thereof is set to about 30 μm, for example. The rigid part 11 is extended from a base end 17 to a front end. The rigid part 11 is formed to be wholly narrow and thick, and the base end 17 is formed such that its width gradually expands toward the base plate 5. The base end of the rigid part 11 is provided with a joint 19 on each side in an across-the-width direction thereof. An end of the joint 19 remains as a cut portion when respective rigid parts are cut from a rigid part chain product where a plurality of rigid parts 11 are provided continuously.

The resilient part 13 is formed from a hinge or resilient member 21 separated from the rigid part 11. The resilient member 21 is made of, for example, a thin stainless-steel rolled plate having spring property or resiliency. The resilient member 21 has bifurcated branches 23 and 25 extending toward the base end 17 of the rigid part on one end. The other end side of the resilient member 21 constitutes a reinforcing plate 27 having a rectangular shape so as to overlap with the base plate 5 entirely. The branches 23 and 25 of resilient member 21 are fixed to the joint 19 of the rigid part 11 at a plurality of welded spots 29 formed by, for example, laser-welding. By fixing the branches 23 and 25 to the joint 19, a window 30 is formed between the rigid part 11 and the base plate 5. Accordingly, the load beam 3 includes the rigid part 11 and the resilient part 13, and the rigid part 11 is supported to the base plate 5 through the resilient part 13. The reinforcing plate 27 which is the other end of the resilient member 21 is fixed to the base plate 5 at a plurality of welded spots 31 formed by, for example, laser-welding. The reinforcing plate 27 constitutes a base plate 5 side together with the base plate 5.

The flexure 7 includes an electrically conductive and thin plate-like base material 33 made of, for example, a resilient thin stainless-steel rolled plate (SST) having spring property or resiliency. On the base material 33, an insulating layer 35 is formed. On the insulating layer 35, read/write wiring patterns 37 are formed. The flexure 7 is fixed to the rigid part 11 at welded spots 39 formed by, for example, laser-welding. One end of the wiring patterns 37 on the flexure 7 are electrically connected to read/write terminals supported on a slider of the head 9, and the other end thereof is extended toward the base plate 5. On the base plate 5, the flexure 7 is provided with a curved portion 41 curving sideward. The curved portion 41 includes tongues 43 and 45 for fixing the flexure 7 to the base plate 5 side. The tongues 43 and 45 are laser-welded to the reinforcing plate 27 and the base plate 5 at welded spots 47, to the flexure 7 to the base plate 5 side.

Next, recessed portions for avoiding vibration contact of the flexure 7 with the rigid part 11 of the load beam 3 will be explained.

As shown in FIGS. 1 to 3, the flexure 7 has cut portions 49 and 51 remaining when each flexure 7 is cut from the chain product as a single part. The cut portions 49 and 51 are positioned on the side ends in the across-the-width direction of the base end 17 of the rigid part 11 and are partially protruded outside the base end side 17, as shown in FIG. 2.

Recessed portions 53 and 55 for avoiding vibration contact of the flexure 7 are provided in the rigid part 11 of the load beam 3. The recessed portions 53 and 55 are formed by partial etching or pressing at portions of the base end 17 of the rigid part 11 corresponding to free ends of the cut portions 49 and 51. Each of the recessed portions 53 and 55 has an opening on an upper surface of the base end 17. A depth of each of the recessed portions 53 and 55 that is a depth from the opening to a bottom thereof is set to be ½ of the thickness of the rigid part 11. Each recessed portion is extended along the free end of the cut portion in a longitudinal direction of the load beam 3 to a curved front edge of the base end 17. In the front edge of the base end 17, the recessed portion 53 (55) is provided with a side opening to communicate with outside of the load beam 3 in the longitudinal direction of the load beam 3.

As shown in FIG. 3A, the cut portions 49 and 51 of the flexure 7 are arranged on the recessed portions 53 and 55 and spaced from the bottoms of the recessed portions 53 and 55, respectively.

Therefore, even if the cut portions 49 and 51 of the flexure 7 vibrate or flutter during ultrasonic washing, vibration contact of the cut portions 49 and 51 with the base end 17 of the rigid part 11 can be suppressed by the recessed portions 53 and 55. Accordingly, color change or discoloration of the base end 17 to which the cut portions 49 and 51 are opposed can be suppressed.

It is unnecessary to form the cut portions 49 and 51 to be long for avoiding color change, and thereby high flexibility for design of not only the flexure 7 but also the head suspension 1 can be achieved.

Modification of the first embodiment will be explained with reference to FIG. 3B.

Figure 3B:
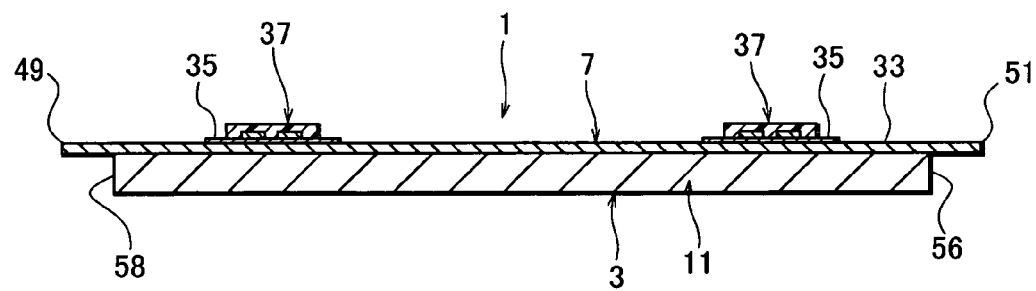
FIG. 3B is a sectional view showing a modification of the first embodiment, the parts shown in FIG. 3B corresponding to the parts shown in FIG. 3A.

FIG. 3B is a sectional view showing a modification of the first embodiment, the parts shown in FIG. 3B corresponds to the parts shown in FIG. 3A.

The structure of the modification is basically the same as that of the first embodiment, and the modification has through-hole portions 56 and 58 instead of the recessed portion 53 and 55 of the first embodiment.

The through-hole portions 56 and 58 are extended from the upper surface to a lower surface in thickness direction and have openings on the upper and lower surfaces. Namely, through-hole portions 56 and 58 pierce through the base end 17 of the rigid part 11 of the load beam 3.

Each through-hole portion is extended along the free end of the cut portion in a longitudinal direction of the load beam 3 to a curved front edge of the base end 17. In the front edge of the base end 17, the through-hole portion 56 (58) is provided with a side opening to communicate with outside of the load beam 3 in the longitudinal direction of the load beam 3.

The modification provides effects similar to those of the first embodiment.

Second Embodiment

Figure 4:
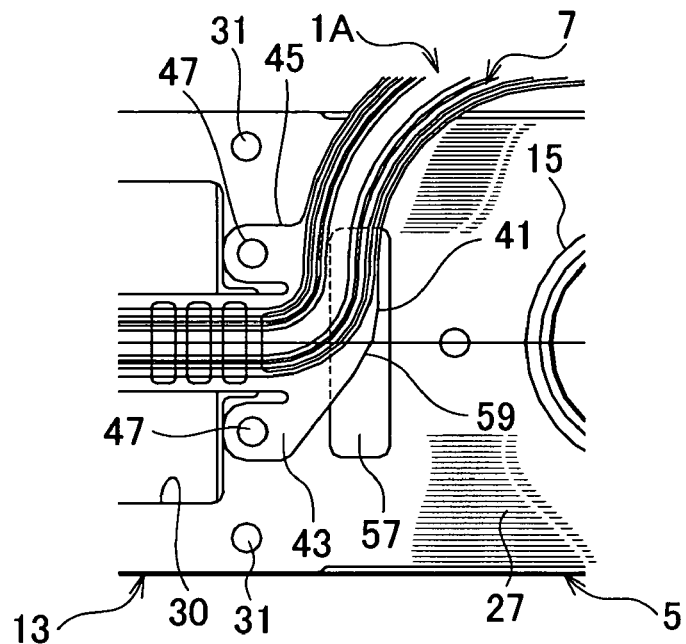
FIG. 4 is an enlarged plan view partly showing a head suspension according to a second embodiment of the present invention.
Figure 5:
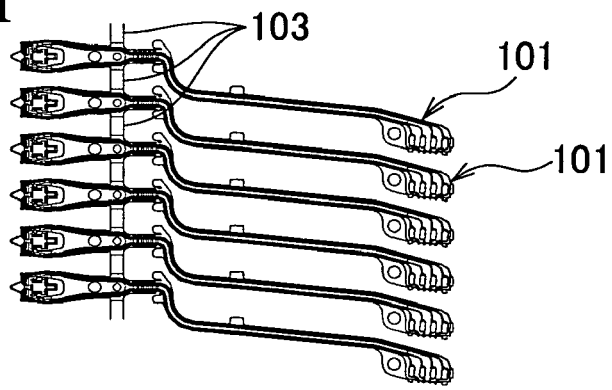
FIG. 5 is a plan view showing a flexure chain product according to a related art.
Figure 6:
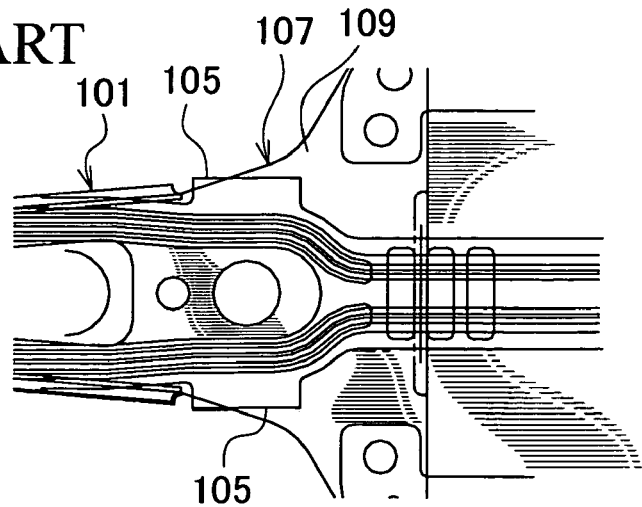
FIG. 6 is an enlarged plan view partly showing a head suspension according to a related art.
Figure 7:
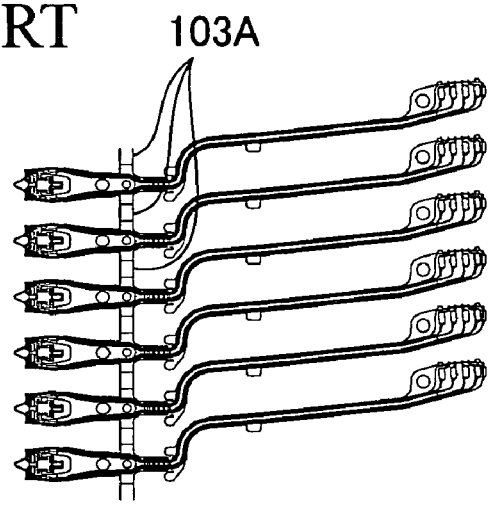
FIG. 7 is a plan view showing a flexure chain product according to a related art.
Figure 8:
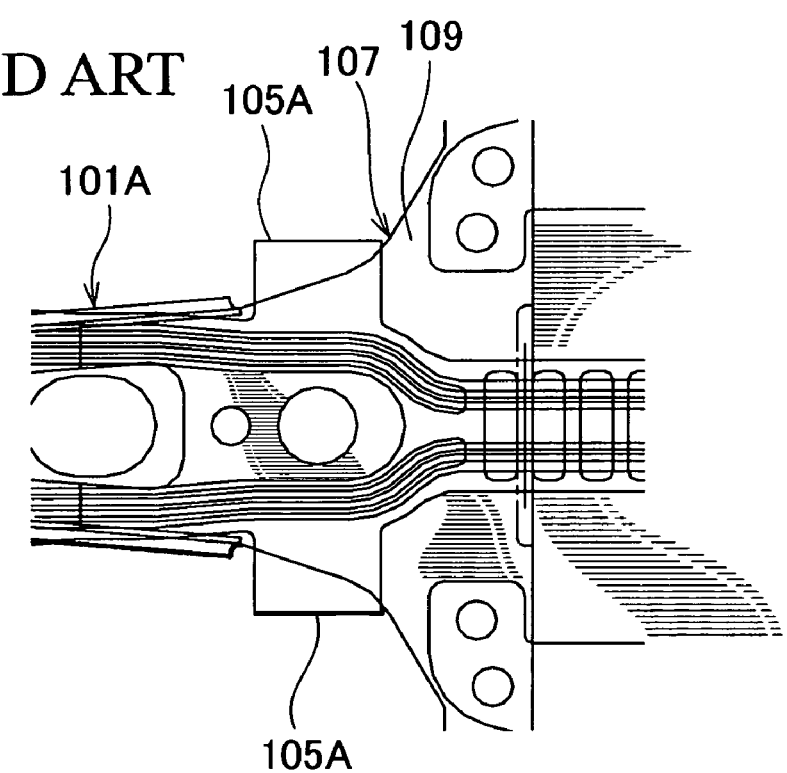
FIG. 8 is an enlarged plan view partly showing a head suspension according to a related art.

FIG. 4 is an enlarged plan view partly showing a main portion of a head suspension according to a second embodiment of the present invention. The structure of the second embodiment is basically the same as that of the first embodiment, and therefore, the same or corresponding parts are represented with the same reference numerals or the same reference numerals plus "A."

According to a head suspension 1A of the embodiment, a recessed portion 57 for avoiding vibration contact of the curved portion 41 of the flexure 7 is provided in the base plate 5 side.

As described above, the flexure 7 has the curved portion 41 curving sideward on the base plate 5, and the recessed portion 57 corresponds to the curved portion 41. The recessed portion 57 is formed at a central portion of the base plate 5 side in an across-the-with direction thereof such that a length of the recessed portion 57 is distributed approximately equally in the across-the-with direction regarding the central portion. The recessed portion 57 has an opening, which has a rectangular shape, on an upper surface of the reinforcing plate 27.

The flexure 7 is fixed on the reinforcing plate 27 on the base plate 5 side, so that the flexure 7 is disposed on the reinforcing plate 27. The recessed portion 57 is defined by a through hole formed in the reinforcing plate 27 by etching and an upper surface of the base plate 5. Namely, the through hole pierces through the reinforcing plate 27 in a thickness direction thereof and the lower opening of the through hole is closed by the base plate 5, and thereby the recessed portion 57 which has a bottom constituted by the upper surface of the base plate 5 is formed. A recess may be also provided in the base plate 5 by partial etching, press working, or the like, and the recessed portion of the base plate 5 side may be defined by the recess and the through-hole of the reinforcing plate 27. Alternatively, a through hole may be also provided in the base plate, and the through-hole portion may be formed in the base plate 5 side instead of the recessed portion 57.

According to the second embodiment, the recessed portions 53 (56) and 55 (58) on the rigid part side may be also provided like the first embodiment. It is selected optionally, it may provide only the recessed portion, corresponding to the curved portion 41, of the base plate 5 side.

According to the second embodiment, vibration contact of the curved portion 41 with the base plate 5 side can be avoided by the recessed portion 57 during ultrasonic washing, so that color change on the base plate 5 side, i.e., the reinforcing plate 27 can be suppressed.

It may set a recessed portion or a through-hole portion for avoiding vibration contact of flexure with the load beam 3 and the base plate 5 side at any required portion thereof.

What is claimed is:

1. A head suspension for supporting a head, for reading and writing, from a carriage of a hard disk drive which turns on a spindle, comprising:
   a base attached to the carriage of the hard disk drive and turned around the spindle;
   a load beam including a rigid part, a front end configured to accept the head, and a resilient part, to apply load onto the head at the front end of the load beam to write and read data to and from a disk arranged in the hard disk drive, the load beam including a rigid part having a base end supported on the base through the resilient part;
   a flexure attached to at least the rigid part of the load beam and extending longitudinally along the load beam in a direction from the base end to the front end and having read/write wiring patterns connected to the head, the flexure having an interconnection protrusion terminating in a free end which is formed by a cut separating the flexure from a chain of flexures connected via the interconnection protrusion, the interconnection protrusion protruding laterally from a longitudinally extending edge of the flexure and the interconnection protrusion being deflectable relative to the rigid part by vibration thereof; and
   the load beam having a vibration clearance opening formed as one of a recessed portion or a through-hole portion in the load beam and configured and positioned such that vibration contact of the interconnection protrusion of the flexure with the load beam is prevented.

2. The head suspension of claim 1, wherein
   the flexure is provided with a curved portion curving sideward on the base, and
   the base has a base vibration clearance opening formed as one of a recessed portion or a through-hole portion provided in the base and configured and positioned to prevent vibration contact of the curved portion with the base.

3. The head suspension of claim 2, wherein the vibration clearance opening is the recessed portion and the recessed portion of the vibration clearance opening is formed by partial etching.

4. The head suspension of claim 1 wherein the vibration clearance opening is the recessed portion and the recessed portion of the vibration clearance opening is formed by partial etching.

5. A head suspension for supporting ahead, for reading and writing, from a carriage of a hard disk drive which turns on a spindle, comprising:
   a base attached to the carriage of the hard disk drive and turned around the spindle;
   a load beam including a rigid part, a front end configured to accept the head, and a resilient part, to apply load onto the head at the front end of the load beam to write and read data to and from a disk arranged in the hard disk drive, the load beam including a rigid part having a base end supported on the base through the resilient part;
   a flexure attached to at least the rigid pan of the load beam and extending longitudinally along the load beam in a direction from the base end to the front end and having read/write wiring patterns connected to the head, the flexure having an interconnection protrusion terminating in a free end which is formed by a cut separating the flexure from a chain of flexures connected via the interconnection protrusion, the interconnection protrusion protruding laterally from a longitudinally extending edge of the flexure and positioned at a longitudinally extending side edge of the base end of the rigid part and the interconnection protrusion being deflectable relative to the rigid part by vibration of the interconnection protrusions; and
   a vibration clearance opening formed as one of a recessed portion or a through-hole portion in the base end of the rigid part and configured and positioned such that vibration contact of the interconnection protrusion of the flexure with the base end of the rigid part is prevented.

6. The head suspension of claim 5 wherein the interconnection protrusion partially protrudes beyond the longitudinally extending side edge of the base end.

7. The head suspension of claim 6 wherein the vibration clearance opening extends along the free end of the interconnection protrusion and extends to the longitudinally extending side edge so as to form a side opening in the rigid part to laterally communicate an interior of the vibration clearance opening with outside of the rigid part in a longitudinal direction of the load beam.

8. The head suspension of claim 5 wherein the vibration clearance opening extends along the free end of the interconnection protrusion and extends to the longitudinally extending side edge so as to form a side opening in the rigid pan to laterally communicate an interior of the vibration clearance opening with outside of the rigid part in a longitudinal direction of the load beam.

9. A head suspension for supporting a read/write head from a carriage of a hard disk drive which turns on a spindle, comprising:
a base attached to the carriage of the hard disk drive and turned around the spindle, the base having a base side edge;
a load beam including a rigid part extending longitudinally from a base end and to a front end configured to accept the head, and a resilient part having a first part connected to the base end of the rigid part and a second part connected to the base so as to support the rigid part to apply load onto the head;
the base end of the rigid part having a base end edge opposing the base side edge of the base across a gap bridged by the resilient part, and the rigid part having rigid part side edges opposing one another and extending in the longitudinal direction of the rigid part;
a flexure attached to at least the rigid part of the load beam and extending longitudinally along the load beam to the front end of the load beam whereat the flexure is configured to accept the head;
the flexure having opposing side flexure edges and an interconnection protrusion overlapping the rigid part and extending from at least one of the side flexure edges in a form of a tab having first and second tab edges opposing one another, and a free end terminating the tab, the first and second tab edges extending in a lateral direction of the rigid part, the interconnection protrusion being deflectable relative to the rigid part by vibration of the interconnection protrusion producible by ultrasonic processing; and
the rigid part defines a vibration clearance opening formed as one of a recessed portion or a through-hole portion in the base end of the rigid part, the vibration clearance opening being positioned apart from and non-intersecting with said base end edge, said vibration clearance opening being disposed at a portion of the base end aligned with the interconnection portion and proportioned such that vibration contact of the interconnection protrusion of the flexure with the base end of the rigid part producible by ultrasonic processing is prevented by a void adjacent the interconnection protrusion provided by the vibration clearance opening.

10. The head suspension of claim 9, wherein:
the flexure is provided with a curved portion curving sideward on the base plate, said curved portion being deflectable by ultrasonic processing; and
the base has a base disposed vibration clearance opening formed as one of a recessed portion or a through-hole portion provided in the base apart from said base side edge and positioned and proportioned such that vibration contact of the curved portion with the base producible by ultrasonic processing is prevented by a void adjacent the curved portion provided by the base disposed vibration clearance opening.

11. The head suspension of claim 10 wherein the interconnection protrusion partially protrudes beyond a corresponding one of the rigid part side edges.

12. The head suspension of claim 11 wherein the vibration clearance opening in the rigid part extends to a corresponding one of the rigid part side edges such that an interior of the vibration clearance opening communicates laterally outward of the rigid via an opening in a side wall of the corresponding one of the rigid part side edges.

13. The head suspension of claim 9 wherein the interconnection protrusion partially protrudes beyond a corresponding one of the rigid part side edges.

14. The head suspension of claim 13 wherein the vibration clearance opening in the rigid part extends to the corresponding one of the rigid part side edges such that an interior of the vibration clearance opening communicates laterally outward of the rigid part via an opening in a side wall of the corresponding one of the rigid part side edges.

15. The head suspension of claim 9 wherein the vibration clearance opening in the rigid part extends to a corresponding one of the rigid part side edges such that an interior of the vibration clearance opening communicates laterally outward of the rigid part via an opening in a side wall of the corresponding one of the rigid part side edges.

* * * * *